(No Model.)
J. T. TITUS.
TRAP.
No. 245,674. Patented Aug. 16, 1881.
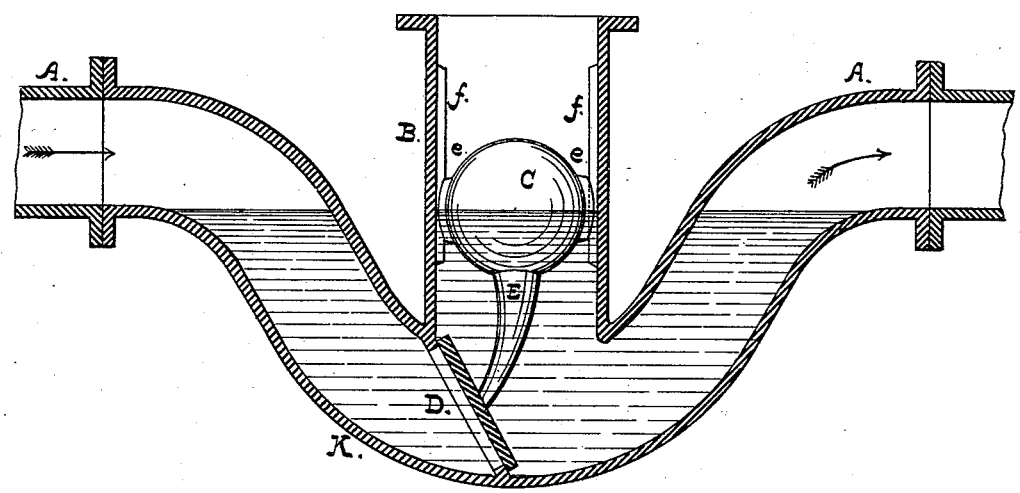
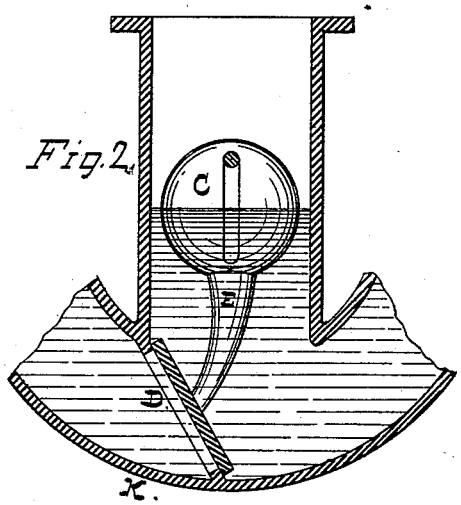
Witnesses:
W. Voit
E. W. F. Clark
Inventor:
John T. Titus
By his Attys., Poore & Osborn

UNITED STATES PATENT OFFICE.

JOHN T. TITUS, OF SAN FRANCISCO, CALIFORNIA, ASSIGNOR OF ONE-HALF TO MICHAEL J. DONOVAN, OF SAME PLACE.

TRAP.

SPECIFICATION forming part of Letters Patent No. 245,674, dated August 16, 1881.

Application filed March 10, 1881. (No model.)

*To all whom it may concern:*

Be it known that I, JOHN T. TITUS, of the city and county of San Francisco, in the State of California, have invented certain new and useful Improvements in Traps for Sewer, Drain, or Waste Pipes; and I do hereby declare that the following is a full, clear, and exact description thereof, reference being had to the accompanying drawings.

My invention relates to an improved trap or valve for preventing the foul gases which are generated in main sewers from passing through the branch or house sewers and waste-pipes into the rooms of the houses with which the branch sewers connect. It also prevents water from passing from the main sewer into the cellars of the houses with which the side sewers connect in case the main sewer should become choked or where the tide-water rises up into the main sewer.

It consists of an arrangement by which a valve, plug, or stopper connected with a float is made to automatically drop down and close the passage through the sewer or pipe when no water is passing through it. This valve stands at such an angle across the passage that water passing through the pipe or sewer from the house to the main sewer opens it; but any pressure on its opposite side, either gas or water, presses it more firmly upon its seat.

Referring to the accompanying drawings, Figure 1 is a vertical section. Fig. 2 shows one mode of guiding and holding the float.

Let A represent a side or branch sewer which leads the sewage from a house to the main sewer. At some convenient point in the length of this sewer or pipe I make a downward semicircular bend, K, as shown at Fig. 1, so as to form a trap that will hold a constant body of water. Above the lowest part of this bend I connect a vertical tube or pipe, B, with the upper side of the pipe or sewer, and this pipe can extend up to the surface of the ground and be covered or closed at its upper end by any suitable device. This forms a chamber over the lowest part of the trap, in which the water will stand at the same level that it does in the bend on each side. Into this vertical tube or chamber I drop a ball-float, C, to the lower side of which an angular plug, valve, or stopper, D, is connected by a wire rod or other stem, E, so that the valve, plug, or stopper will stand at an angle across the opening which leads into the chamber on the house side. Around the passage which opens into this chamber on the house side I make an angular seat corresponding with the edge of the valve, plug, or stopper, so that the valve or stopper will accommodate itself to this seat when it is pressed down by the float C. The float or ball C is guided in its movement in the chamber or tube B either by projecting flanges *e e* on each side entering vertical grooves *f* in the side of the tube or chamber, as shown, or by other equivalent means that will allow it to move up and down freely and partially rotate when the valve is raised by the pressure of water against its under side.

When the bend or trap is full of standing water the ball or float will press the valve D upon its seat across the passage, in which position it will remain until water attempts to pass through to the main sewer on its way from the house. When this happens the additional pressure of water against the lower inclined face of the valve or stopper will force it from its seat and lift the ball or float C in the vertical tube or chamber, so as to allow the water to pass through to the main sewer under the valve; but when the valve is on its seat and closed any pressure coming from the main sewer, whether it be gas or water, will only press it more firmly upon its seat, because the angular position of the valve prevents it from being opened by pressure against its upper side in the chamber.

The stem-connection E, I make wedge-shaped, with its sharp edge toward the house-sewer, so that it will be less liable to catch and lodge any rags, pieces of paper, or other substance that is carried by the water.

Instead of guiding the ball or float by flanges on each side, an elongated hole could be made horizontally through its center, as shown at Fig. 2, and a shaft or rod passed through it and connected with the sides of the chamber or pipe.

By this means I provide a simple and effective gas and water check for side or branch sewers.

The pipe or chamber B extends to the surface, so that the valve and float can be easily removed for repairs or to be cleaned when necessary.

Having thus described my invention, what I claim, and desire to secure by Letters Patent, is—

In a side sewer, drain, or waste pipe, A, the semicircular bend or water-trap K, having the vertical tube or chamber B above its lowest part, and provided with a valve-seat around the opening which connects the house side of the sewer with the chamber, in combination with an angular valve, stopper, or plug, D, which is connected with a ball or float, C, by a stem, E, by means of which the float is dropped and held upon its seat in an angular position across the passage, so that it will be opened automatically by water passing from the house to the main sewer, but be pressed more firmly upon its seat by any pressure coming from the main sewer, substantially as described.

In witness whereof I have hereunto set my hand and seal.

JOHN T. TITUS. [L. S.]

Attest:
WM. F. CLARK,
EDWARD E. OSBORN.